(12) United States Patent
Fraley et al.

(10) Patent No.: US 9,791,006 B2
(45) Date of Patent: Oct. 17, 2017

(54) BRAKE ROTOR ASSEMBLY

(71) Applicant: GUNITE CORPORATION, Evansville, IN (US)

(72) Inventors: Paul Fraley, Houghton, MI (US); Matt Kero, Calumet, MI (US); Nick Weinberg, Laurium, MI (US); Larry Anderson, Calumet, MI (US)

(73) Assignee: GUNITE CORPORATION, Evansville, IN (US)

( * ) Notice: Subject to any disclaimer, the term of this patent is extended or adjusted under 35 U.S.C. 154(b) by 51 days.

(21) Appl. No.: 14/919,213

(22) Filed: Oct. 21, 2015

(65) Prior Publication Data

US 2016/0047431 A1    Feb. 18, 2016

Related U.S. Application Data

(63) Continuation of application No. 13/602,963, filed on Sep. 4, 2012, now abandoned.

(60) Provisional application No. 61/573,334, filed on Sep. 2, 2011.

(51) Int. Cl.
   *F16D 65/12*  (2006.01)
   *F16D 65/00*  (2006.01)
   *F16D 65/02*  (2006.01)

(52) U.S. Cl.
   CPC ......... *F16D 65/125* (2013.01); *F16D 65/126* (2013.01); *F16D 65/127* (2013.01); *F16D 65/128* (2013.01); *F16D 2065/1392* (2013.01); *F16D 2200/0047* (2013.01); *F16D 2300/10* (2013.01)

(58) Field of Classification Search
   CPC ........ F16D 65/125–65/128; F16D 2065/1392; F16D 2300/10; F16D 2200/0047
   See application file for complete search history.

(56) References Cited

U.S. PATENT DOCUMENTS

| | | |
|---|---|---|
| 410,734 A | 9/1889 | Hutchins |
| 2,671,939 A | 3/1954 | Everhart et al. |
| 3,391,763 A | 7/1968 | Severson |
| 3,895,693 A | 7/1975 | Lucien et al. |
| 4,051,930 A | 10/1977 | Masclet |
| 5,299,667 A | 4/1994 | Hammond |
| 5,535,857 A | 7/1996 | Barlow |
| 5,878,849 A | 3/1999 | Prunier, Jr. et al. |
| 5,957,251 A | 9/1999 | Jones et al. |

(Continued)

FOREIGN PATENT DOCUMENTS

| WO | WO 2005/069972 A2 | 8/2005 |
| WO | WO 2005/087575 A1 | 9/2005 |

(Continued)

OTHER PUBLICATIONS

English language abstract for WO 2010/061659 extracted from espacenet.com database on Feb. 1, 2016, 2 pages.

*Primary Examiner* — Melody Burch
(74) *Attorney, Agent, or Firm* — Howard & Howard Attorneys PLLC

(57) ABSTRACT

A brake rotor assembly, and method for forming a brake rotor assembly, that includes an integrally formed first disc member coupled to an integrally formed second disc member, wherein a first portion of the outer surface of the first disc member and the second disc member is formed from a metal matrix composite and the remainder of the first disc member and second disc member is formed from the support element used in the first portion.

18 Claims, 10 Drawing Sheets

(56) References Cited

U.S. PATENT DOCUMENTS

| | | |
|---|---|---|
| 6,042,935 A | 3/2000 | Krenkel et al. |
| 6,309,743 B1 | 10/2001 | Fujita |
| 6,386,341 B1 | 5/2002 | Martin |
| 6,458,466 B1 | 10/2002 | Jones et al. |
| 6,530,458 B1 | 3/2003 | Rau, III |
| 7,163,653 B2 | 1/2007 | Ehnert |
| 7,278,519 B2 | 10/2007 | Iwai et al. |
| 7,370,738 B2 | 5/2008 | Vollweiter |
| 7,793,703 B2 | 9/2010 | Wood et al. |
| 8,016,018 B2 | 9/2011 | Wood et al. |
| 8,075,827 B2 | 12/2011 | Loukus et al. |
| 2005/0183909 A1 | 8/2005 | Rau, III et al. |
| 2005/0217950 A1 | 10/2005 | Jolley, Jr. et al. |
| 2009/0026025 A1 | 1/2009 | Hampton |
| 2009/0311541 A1 | 12/2009 | Wood et al. |
| 2009/0312174 A1 | 12/2009 | McCullough et al. |
| 2010/0001231 A1 | 1/2010 | Loukus et al. |
| 2010/0187053 A1 | 7/2010 | Botsch et al. |
| 2011/0255979 A1 | 10/2011 | Matsushita |
| 2012/0080277 A1 | 4/2012 | Wood et al. |
| 2012/0227624 A1 | 9/2012 | Loukus et al. |
| 2013/0087420 A1 | 4/2013 | Fraley et al. |

FOREIGN PATENT DOCUMENTS

| | | |
|---|---|---|
| WO | WO 2006/113762 A2 | 10/2006 |
| WO | WO 2007/033378 A1 | 3/2007 |
| WO | WO 2008/070636 A1 | 6/2008 |
| WO | WO 2010/061659 A1 | 6/2010 |

BRAKE ROTOR ASSEMBLY

CROSS REFERENCE TO RELATED APPLICATION

This application is a continuation of U.S. patent application Ser. No. 13/602,963 filed Sep. 4, 2012, which claims the benefit of U.S. Provisional Patent Application Ser. No. 61/573,334 filed Sep. 2, 2011, the disclosures of which are hereby incorporated by reference.

BACKGROUND OF THE INVENTION

1. Field of the Invention

The subject invention generally relates to a brake rotor assembly for a vehicle.

2. Description of the Prior Art

Metal matrix composites (MMCs) are composite materials that comprise at least two constituents, one being a primary metal and the other being a different secondary metal or another material, such as a ceramic article or organic compound. As compared to monolithic materials comprising a single constituent, MMCs have a higher strength-to-density ratio, a higher stiffness-to-density ratio, and higher strength at elevated temperatures. MMCs also have a higher wear resistance than monolithic materials. As such, MMCs are typically useful for applications requiring wear resistance and strength, e.g., brakes. More specifically, MMCs provide higher/better wear resistance when utilized in brakes and thus extends the life of brakes. For a further discussion of MMCs, see U.S. Pat. No. 7,793,703, U.S. Pat. No. 8,016,018 and U.S. Patent Application Publication No. 2009/0312174 which are herein incorporated by reference.

MMCs are produced by augmenting the primary metal with the secondary metal or other material, which are typically some type of reinforcing material. The metals used for the primary metal and the reinforcing material are typically chosen to optimize the desired mechanical and physical properties of the MMCs. Numerous combinations of metals and reinforcing materials are known in the art. Examples of an effective metal as the primary metal are aluminum, magnesium, titanium, copper, zinc, and superalloys. Examples of effective reinforcing materials comprise boron carbide, silicon carbide, alumina, and graphite, and are available in the form of continuous fibers, discontinuous fibers, particles, and whiskers.

SUMMARY OF THE INVENTION AND ADVANTAGES

The present invention provides a brake rotor assembly comprising:
a first disc member having an inner disc surface and an outer disc surface and comprising:
  a first preform comprising ceramic particles and ceramic fibers with said first preform having an inner surface and an opposing outer surface and defining a plurality of voids;
  a first support element comprising a metal, a first portion of said first support element disposed within said plurality of voids of said first perform between said inner surface and said opposing outer surface of said first preform for forming a metal matrix composite with said first support element terminating at said outer surface of said first preform such that said opposing outer surface of said first preform remains exposed;
  said first support element further comprising a backing portion extending from said inner surface of said first preform, said backing portion of said first support element defining at least a portion of said outer disc surface of said first disc member;
  a first wear surface defined by said exposed outer surface and by said first portion of said first support element, said first wear surface defining a portion of said outer disc surface of said first disc member; and
(b) a second disc member coupled to said first disc member, said second disc member having an inner disc surface and an outer disc surface and comprising:
  a second preform comprising ceramic particles and ceramic fibers with said second preform having an inner surface and an opposing outer surface and defining a plurality of voids;
  a second support element comprising said metal, a first portion of said second support element disposed within said plurality of voids of said second perform between said inner surface and said opposing outer surface of said second preform for forming a metal matrix composite with said second support element terminating at said opposing outer surface of said second preform such that said opposing outer surface of said second preform remains exposed;
  said second support element further comprising a backing portion extending from said inner surface of said first preform, said backing portion of said second support element defining at least a portion of said outer disc surface of said second disc member;
  a second wear surface defined by said exposed outer surface and by said first portion of said second support element, said second wear surface defining a portion of said outer disc surface of said second disc member;
  wherein said backing portion of each of said first support element and said second support element are located between said first wear surface and said second wear surface when said first disc member is coupled to said second disc member and
  wherein said inner disc surface of said first disc member is spaced apart from said second disc member when said first disc member is coupled to said second disc member.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE INVENTION

Figure 1:
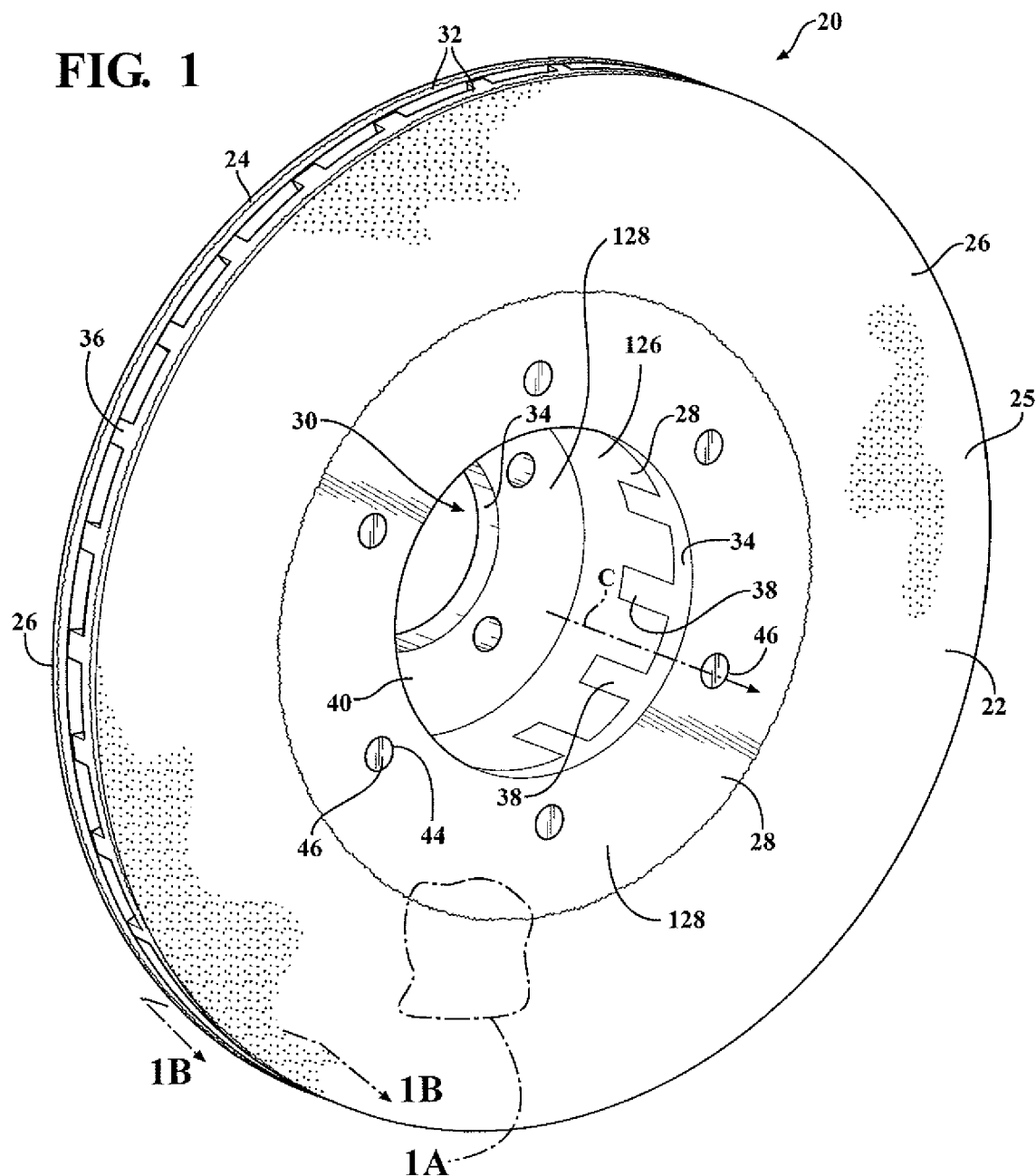
FIG. 1 is a perspective view of a brake rotor assembly according to one exemplary embodiment.

Referring to the Figures, wherein like numerals indicate like or corresponding parts throughout the several views, a brake rotor assembly 20 for a vehicle (not shown) is generally shown. Generally, the brake rotor assembly 20 is utilized with a caliper mechanism for braking or slowing the vehicle as known to those skilled in the art. It is to be appreciated that the brake rotor assembly 20 can be utilized with any suitable mechanism for braking the vehicle. It is also to be appreciated that the vehicle can be a heavy duty type of vehicle, such as a heavy duty truck, etc., a light type of vehicle, such as a car, etc., or any other type of vehicle utilizing a brake system.

Referring to FIGS. 1-4, the brake rotor assembly 20 in accordance with one exemplary embodiment is shown and includes a first disc member 22 and a second disc member 24 coupled to each other. Each disc member 22, 24 include an inner disc surface 23 and an outer disc surface 25, and thus when the disc members 22, 24 are coupled the inner disc surfaces 23 are located between the outer disc surfaces 25 in such a way that there is a gap 29 defined between the inner disc surfaces 23 (i.e. the inner disc surfaces 23 do not abut one another). More specifically, the first and second disc members 22, 24 are attached (i.e. mechanically fastened) to each other as further discussed below.

The first and second disc members 22, 24 each include a first portion 26 and a second portion 28. The first and second portions 26, 28 of the first disc member 22 are adjacent each other, and likewise, the first and second portions 26, 28 of the second disc member 24 are adjacent each other. For illustrative purposes only, various Figures show an imaginary line to help illustrate and distinguish the first portion 26 from the second portions 28. The composition of the first portion 26 and of the second portion 28 of each respective disc 22, 24 will be described in further detail below.

The first and second disc members 22, 24 each define an aperture 30 along a central axis C.

Figure 2:
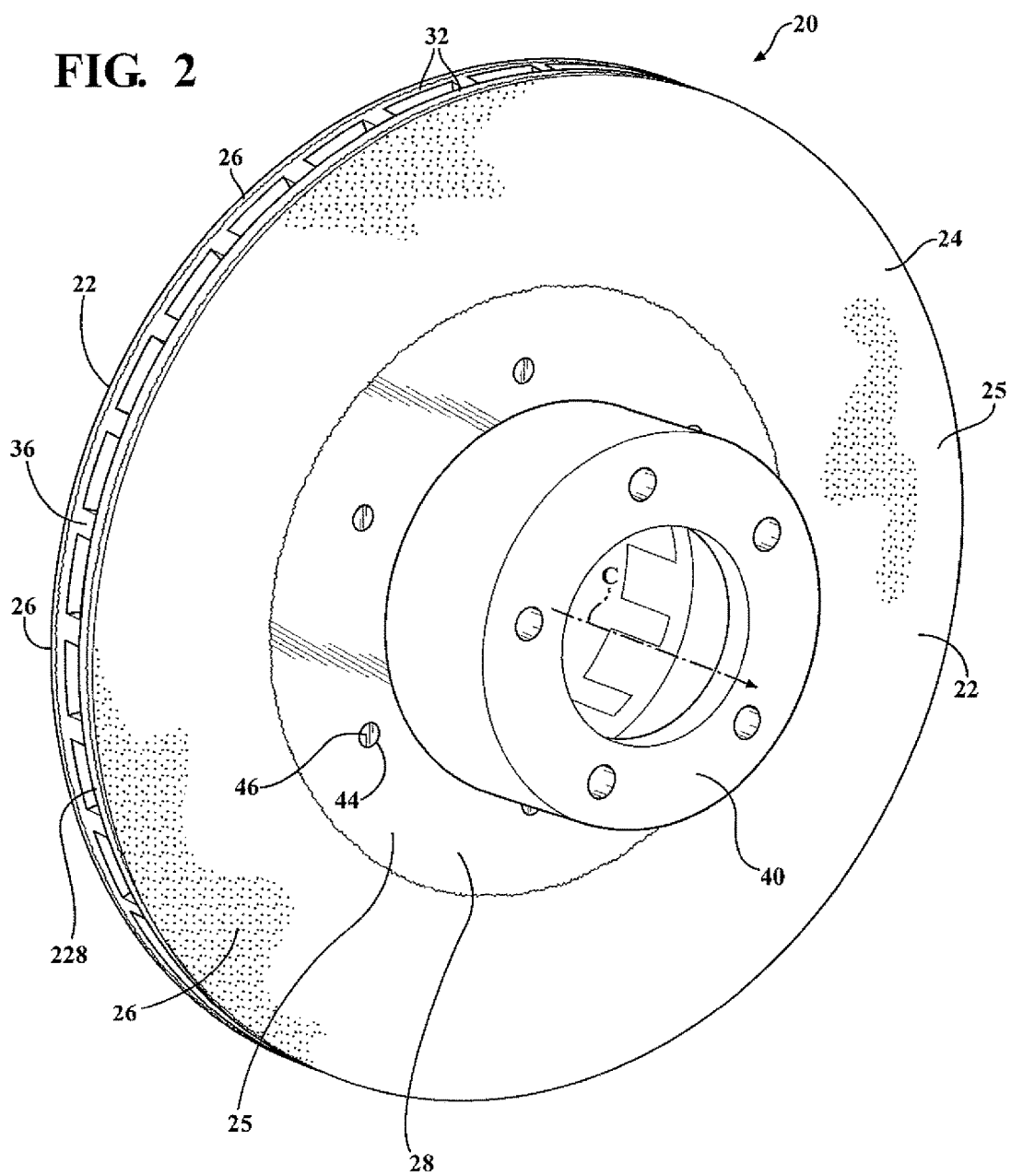
FIG. 2 is a rear view of the brake rotor assembly of FIG. 1.
Figure 3:
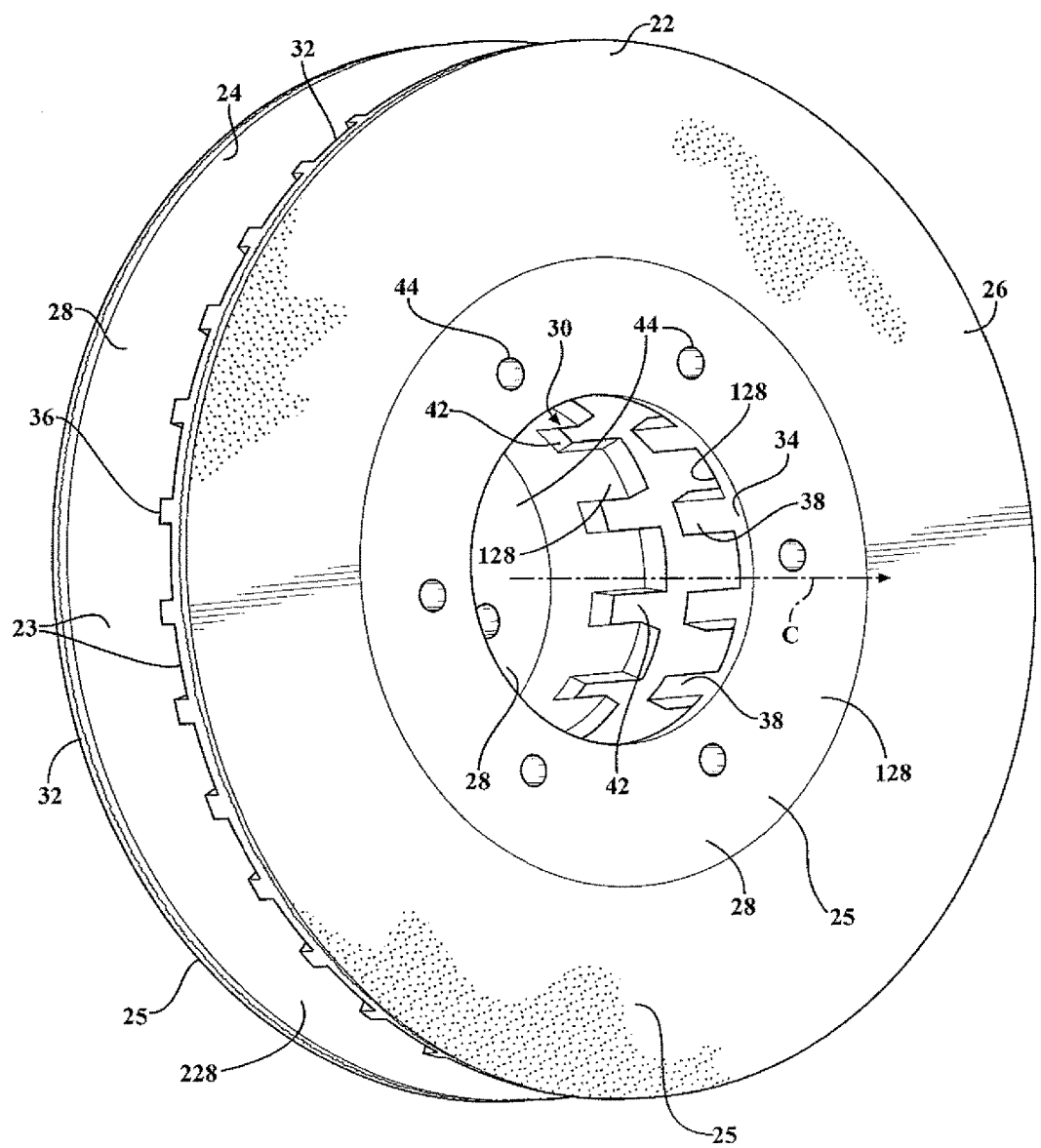
FIG. 3 is an exploded view of the brake rotor assembly of FIG. 1.
Figure 4:
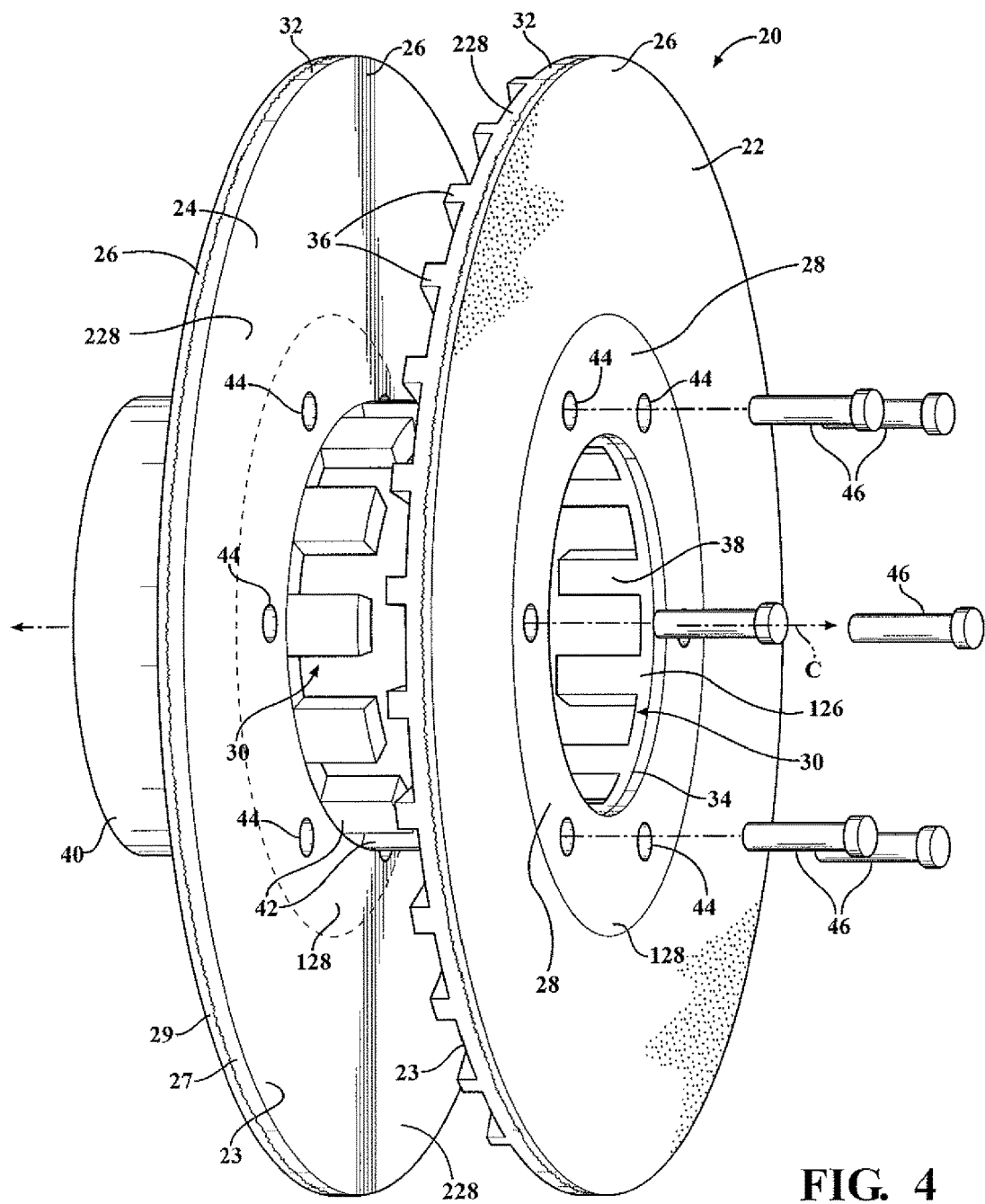
FIG. 4 is another exploded view of the brake rotor assembly of FIG. 1.
Figure 5:
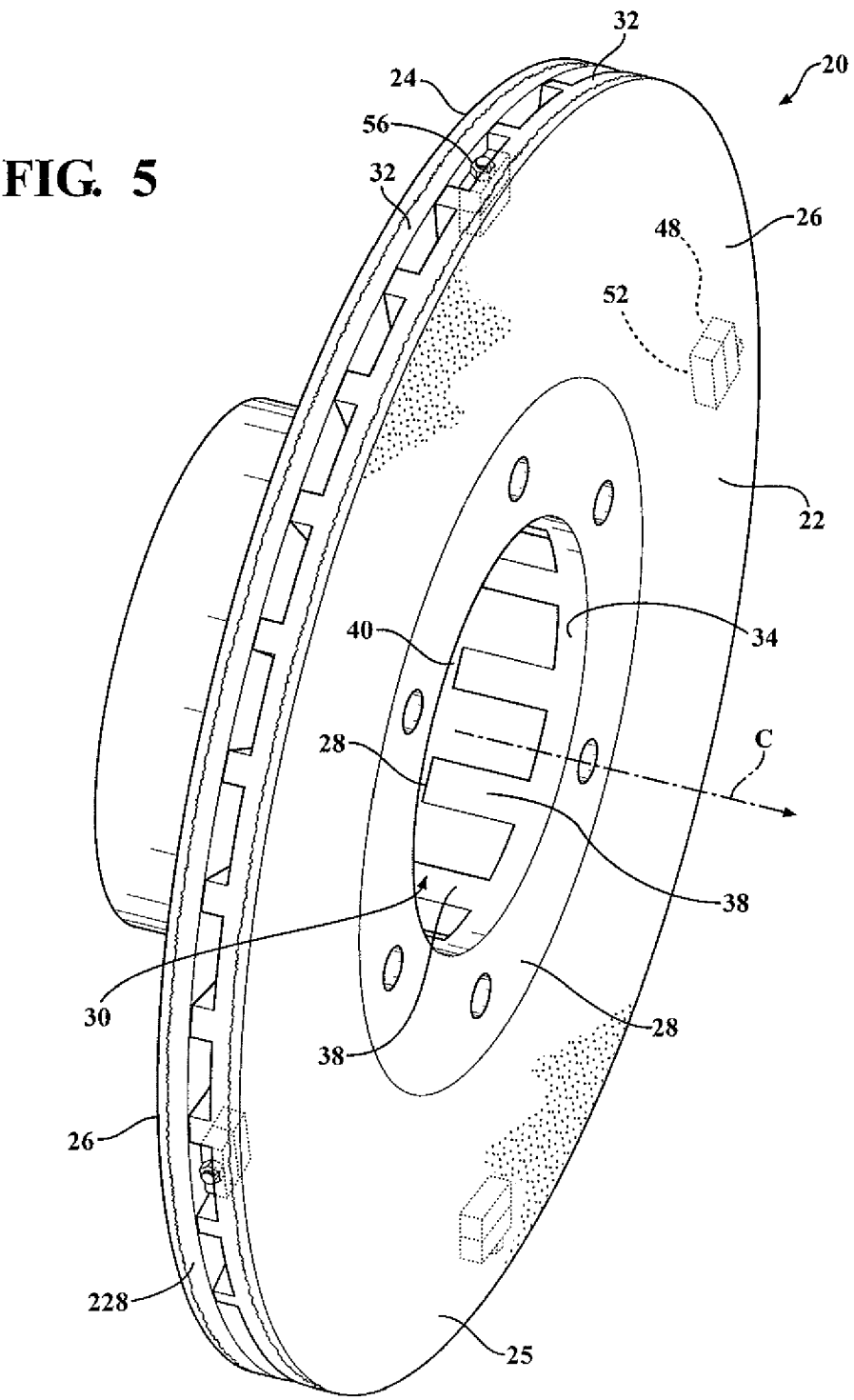
FIG. 5 is a perspective view of a brake rotor assembly according to a second embodiment.
Figure 6:
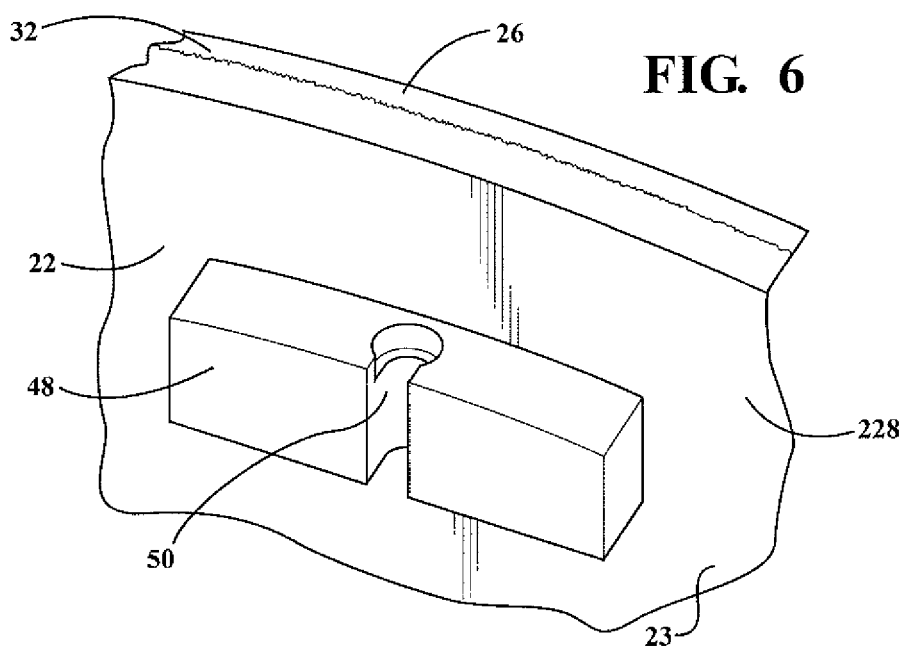
FIG. 6 is an enlarged view of a block of FIG. 5.
Figure 7:
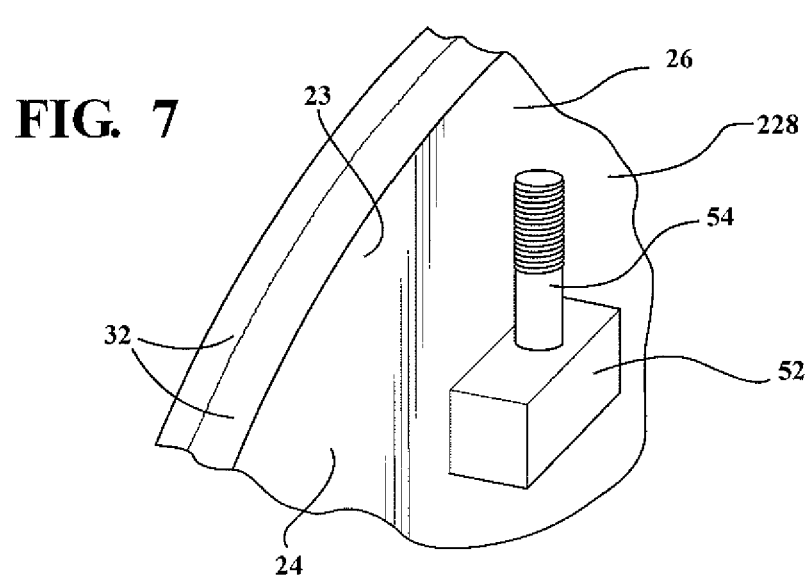
FIG. 7 is an enlarged view of the base portion and the post of FIG. 5.
Figure 8:
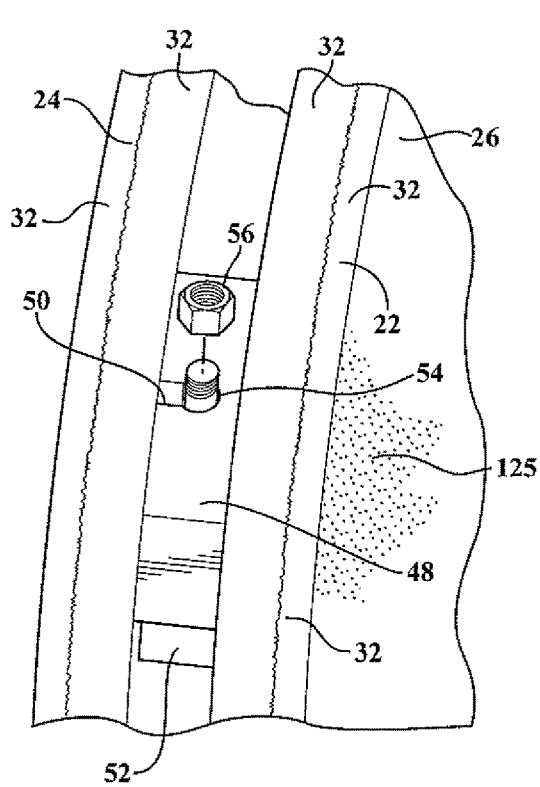
FIG. 8 is a partially exploded view of a nut aligning with the post and the post disposed in a slot of the block of the brake rotor assembly of FIG. 5.
Figure 10:
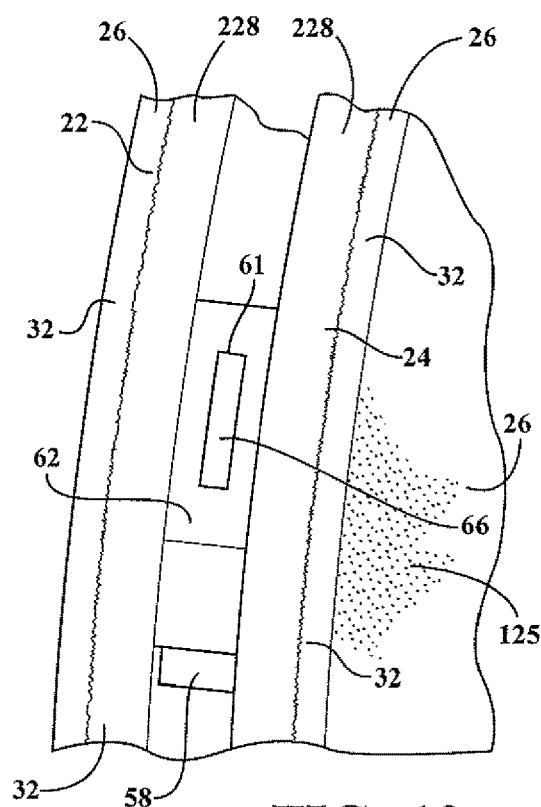
FIG. 10 is an enlarged perspective view of a plug disposed in a first and second opening of a first and second ear according to the brake rotor assembly of FIG. 9.
Figure 12:
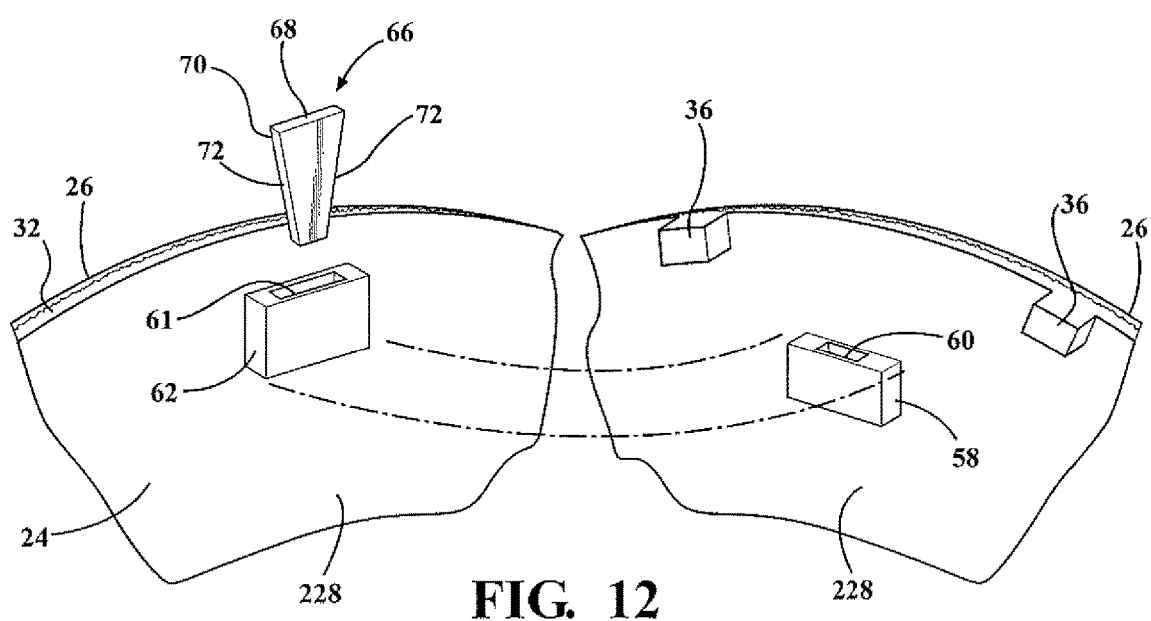
FIG. 12 is an exploded view of the plug, first ear and second ear of the brake rotor assembly of FIG. 9.
Figure 9:
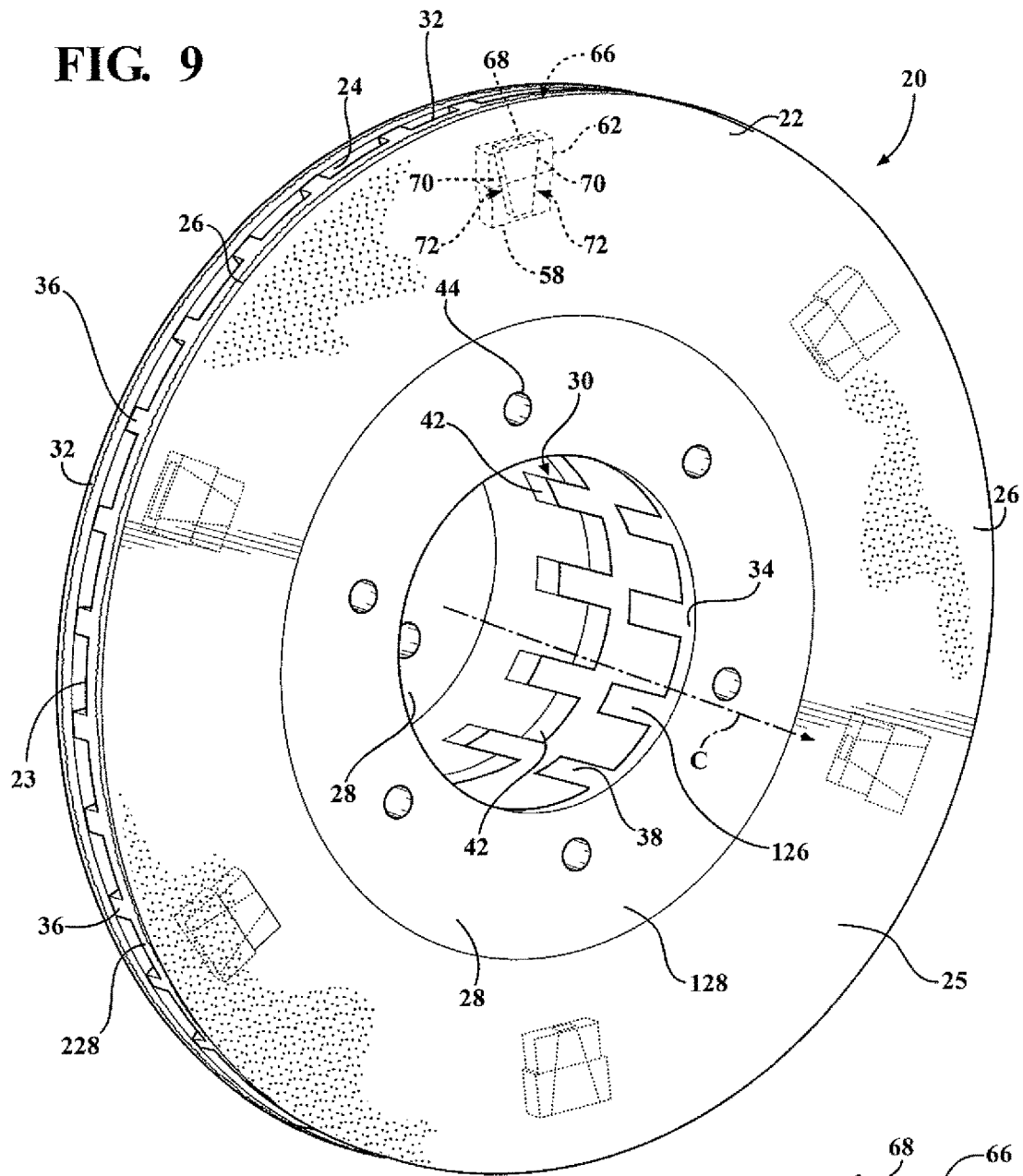
FIG. 9 is a perspective view of a brake rotor assembly of a third embodiment.

In certain embodiments, as best shown in FIGS. 1 and 2, the first portion 26 of the first disc member 22 is spaced from the aperture 30 of the first disc member 22 and the second portion 28 of the first disc member 22 is adjacent the aperture 30 of the first disc member 22, while both the first portion 26 and second portion 28 extend to the outer periphery 32. In other words, an radially inward portion 128 of the second portion 28 of the first disc member 22 is disposed between the aperture 30 and the inner periphery 126 of the first portion 26 of the first disc member 22 radially relative to the central axis C and extends between the inner disc surface 23 and the outer disc surface 25, while a backing portion 228 of the second portion 28 is disposed radially outward from the inner portion 128 and is located adjacent to the first portion 26 and extends to the outer periphery 32 of the disc member 22. In this embodiment, the radially inward portion 128 and backing portion 228 together define the inner disc surface 23 of the first disc member 22.

Likewise, the first portion 26 of the second disc member 24 is spaced from the aperture 30 of the second disc member 24 and the second portion 28 of the second disc member 24 is adjacent the aperture 30 of the second disc member 24. In other words, a radially inward portion 128 of the second portion 28 of the second disc member 24 is disposed between the aperture 30 and the inner periphery 126 of the first portion 26 of the second disc member 24 radially relative to the central axis C and extends between the inner disc surface 23 and the outer disc surface 25, while a backing portion 228 of the second portion 28 is disposed radially outward from the inner portion 128 and is located adjacent to the first portion 26 and extends to the outer periphery 32 of the second disc member 24. In this embodiment, the radially inward portion 128 and backing portion 228 together define the inner disc surface 23 of the second disc member 24.

Alternatively, in other embodiments (not shown), the first portion 26 and the second portion 28 each abut the outer periphery 32 and the aperture 30. In this embodiment, the first portion 26 defines the outer disc surface 25 of the respective disc members 22, 24, while the second portion 28 defines the inner disc surface 23 of the respective disc members 22, 24. Stated differently, the second portion 28 defines a backing portion 228 that extends from the inner periphery 126 and outer periphery 32 and defines the entirety of the inner disc surface 23.

In certain embodiments, as best shown in FIGS. 1, 2, 3, and 4 the first disc member 22 includes a plurality of fins 36 extending outwardly along the central axis C. More specifically, the fins 36 extend outwardly from the second portion 28 of the first disc member 22, and even more specifically from the backing portion 228 of the first disc member 22, toward the second disc member 24 radially relative to the central axis C. The fins 36 abut the second disc member 24 such that the inner disc surface 23 of the first disc member 22 is spaced from the inner disc surface 23 of the second disc member 24. The fins 36 aid in cooling the first and second disc members 22, 24.

It is to be appreciated that the fins 36 can extend from the second disc member 24 instead of the first disc member 22, or the fins 36 can extend from the second disc member 24 in addition to the fins 36 extending from the first disc member 22.

In certain embodiments, such as shown in FIGS. 1, 2, 3 and 4, the first disc member 22 includes a plurality of fingers 38 extending outwardly along the central axis C. More specifically, the fingers 38 extend outwardly toward the second disc member 24 and additionally, the fingers 38 are disposed adjacent the aperture 30 of the first disc member 22. Even more specifically, the fingers 38 extend from the second portion 28 of the first disc member 22. Even more specifically, the fingers 38 extend from the radially inward portion 128 of the first disc member 22. In alternative embodiments not shown, wherein the backing member 228 extends from the inner periphery 126 to the outer periphery 32 (i.e. wherein there is no radially inward portion 128), the fingers 38 may extend from the backing member 228.

Generally, the fingers 38 and the fins 36 extend along the central axis C in the same direction and the fingers 38 are spaced from the fins 36. It is to be appreciated that the fingers 38 and the fins 36 can abut each other. For example, the fingers 38 and the fins 36 can be blended together where the fingers 38 and fins 36 meet. It is to further be appreciated that the fingers 38 can be any suitable configuration and orientation.

As best shown in FIG. 2, the second disc member 24 includes a flange 40 extending outwardly along and transverse to the central axis C such that the aperture 30 of the second disc member 24 defines a first diameter and a second diameter less than the first diameter. More specifically, the flange 40 extends from the second portion 28 of the second disc member 24. Even more specifically, the flange 40 extends from the radially inward portion 128 of the first disc member 22. In alternative embodiments not shown, wherein the backing member 228 extends from the inner periphery 126 to the outer periphery 32 (i.e. wherein there is no radially inward portion 128), the flange 40 may extend from the backing member 228. The aperture 30 of the first disc member 22 complements the first diameter of the aperture 30 of the second disc member 24. It is to be appreciated that the flange 40 can be any suitable configuration and orientation.

The second disc member 24 defines a plurality of recesses 42 extending along the central axis C and spaced from each other. More specifically, the recesses 42 extend along the central axis C away from the first disc member 22. The recesses 42 are adjacent the aperture 30 of the second disc member 24, and more specifically, the recesses 42 are adjacent the aperture 30 defining the first diameter. Even more specifically, the second portion 28 of the second disc member 24 defines the recesses 42. Even more specifically, the radially inward portion 128 of the second disc member 24 defines the recesses 42. In alternative embodiments not shown, wherein the backing member 228 extends from the inner periphery 126 to the outer periphery 32 (i.e. wherein there is no radially inward portion 128), the backing member 228 defines the recesses 42. The fingers 38 and the recesses 42 align with each other; as such, the fingers 38 are disposed in the recesses 42 for keying the first and second disc members 22, 24 together. Further, the fingers 38 and the recesses 42 engage each other for preventing slippage of the first and second disc members 22, 24 relative to each other. The recesses 42 can be any suitable configuration and orientation complementary to the fingers 38.

The second portion 28 of each of the first and second disc members 22, 24 define a plurality of holes 44. Even more specifically, the radially inward portion 128 each of the first and second disc members 22, 24 defines the recesses 42. In alternative embodiments not shown, wherein the backing member 228 extends from the inner periphery 126 to the outer periphery 32 (i.e. wherein there is no radially inward portion 128), the backing member 228 of each of the first and second disc members 22, 24 defines the recesses 42. The holes 44 of the first disc member 22 align with the holes 44 of the second disc member 24. In other words, one hole 44 of the first disc member 22 aligns with one hole 44 of the second disc member 24, etc. The holes 44 of the first disc member 22 are spaced from the inner periphery 34 and the first portion 26 of the first disc member 22. Likewise, the holes 44 of the second disc member 24 are spaced from the inner periphery 34 and the first portion 26 of the second disc member 24. Further, the holes 44 of the first disc member 22 are spaced from the fingers 38 and the holes 44 of the second disc member 24 are spaced from the recesses 42. It is to be appreciated that the holes 44 of the first disc member 22 can be through holes and the holes 44 of the second disc member 24 can be blind holes. It is to further be appreciated that the holes 44 of the second disc member 24 can be through holes.

The brake rotor assembly 20 further includes a plurality of pins 46 disposed in the holes 44 of the first and second disc members 22, 24. Specifically, one pin 46 is disposed in one hole 44 of the first and second disc members 22, 24 and another pin 46 is disposed in another hole 44 of the first and second disc members 22, 24, etc. The pins 46 secure together the first and second disc members 22, 24. In one embodiment, the pins 46 are further defined as bolts. It is to be appreciated that the pins 46 can be further defined as threaded pins, threaded bolts, screws, press-fit pins, interference-fit pins, etc. or any other suitable fastener. The pins 46 are recessed in the holes 44 of the first disc member 22 for preventing the pins 46 from being exposed to various components. When the holes 44 of the second disc member 24 are through holes, the pins 46 can also be recessed in the holes 44 of the second disc member 24 for preventing the pins 46 from being exposed to various components. It is to be appreciated that the holes 44 of the first and second disc members 22, 24 and the pins 46 can be any suitable configuration for cooperating with each other.

Therefore, the fingers 38, the recesses 42, the holes 44, and the pins 46 cooperate to secure the first and second disc members 22, 24 together and prevent separation of the first and second disc members 22, 24. In other words, the fingers 38, the recesses 42, the holes 44, and the pins 46 cooperate to mechanical fasten the first and second disc members 22, 24 together. When, for example, the caliper mechanism engages the first and second disc members 22, 24, a force is applied to the first and second disc members 22, 24, which further pushes or tightens the disc members 22, 24 together.

The brake rotor assembly 20 also provides alternative embodiments for the first and second disc members 22, 24 that are substantially similar to FIGS. 1-4.

Figure 13:
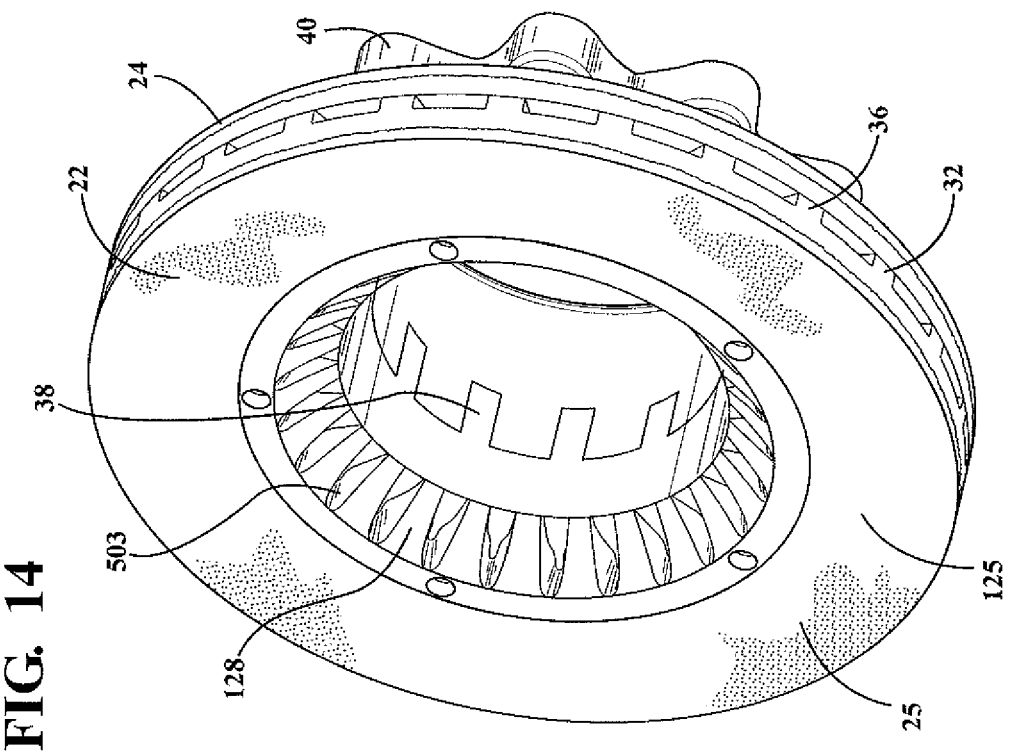
FIG. 13 is a perspective view of a brake rotor assembly according to another exemplary embodiment.

For example, as shown in FIG. 13, an alternative brake rotor assembly 20 is illustrated in which the fins 36 are removed and the overall mass of the discs 22, 24 is increased relative to FIGS. 1-4. In this embodiment, cooling of the disc member 22 is enhanced through the introduction of one or more grooves 501 into the outer disc surface 25, and more specifically into the wear surface 125 of the first portion 26 of the disc 22. These one or more grooves 501 may be incorporated into the design during the forming process or may be cut into the wear surface 125 in a post production step. In addition, the outer surface 25 of the radially inward portion 128 of the second portion 28 may be tapered inward towards the second disc member 24 and include a plurality of notches, or slots 503. The slots 503 further aid in cooling the first disc member 22 during use.

Figure 14:
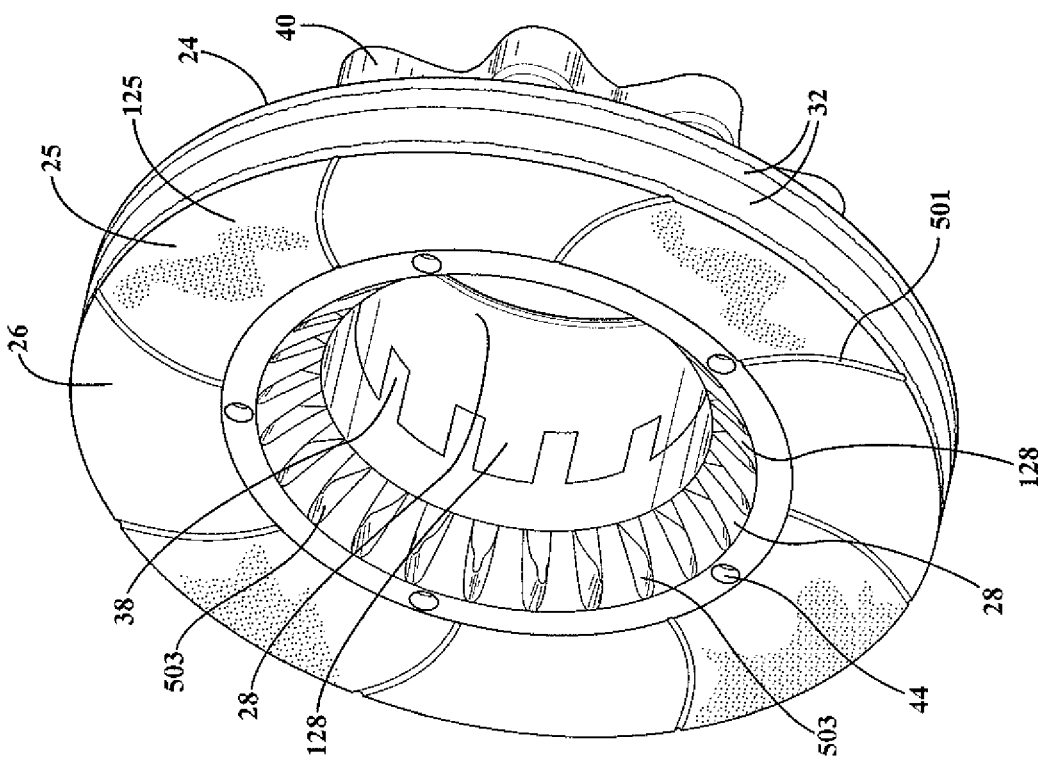
FIG. 14 is a perspective view of a brake rotor assembly according to yet another exemplary embodiment.

As shown in FIG. 14, another alternative brake rotor assembly 20 is illustrated in which the fins 36 are maintained and the overall mass of the discs 22, 24 is increased relative to FIGS. 1-4. Here, as in FIG. 13, the outer surface 25 of the radially inward portion 128 of the second portion 28 may be tapered inward towards the second disc member 24 and include a plurality of notches, or slots 503. The slots 503 further aid in cooling the first disc member 22 during use.

The brake rotor assembly 20 also provides alternative embodiments for mechanically fastening the first and second disc members 22, 24 together. For example, FIGS. 5-8 provide a second embodiment and FIGS. 9-12 provide a third embodiment. Each of these embodiments will be discussed below. All of the features discussed above having common reference numbers apply to the second and third embodiments except as set forth below.

With regard to FIGS. 5-8, the first disc member 22 includes a plurality of blocks 48 spaced from each other radially relative to the central axis C with each of the blocks 48 define a slot 50. The blocks 48 extend from the second portion 28 of the first disc member 22, and more specifically, the blocks 48 are disposed adjacent the outer periphery 32 of the first disc member 22. In certain embodiments, the blocks are integrally formed with the second portion 28 of the first disc member 22.

The second disc member 24 includes a plurality of bases 52 spaced from each other radially relative to the central axis C. More specifically, the bases 52 extend from the second portion 28 of the second disc member 24. In certain embodiments, the bases 52 are integrally formed with the second portion 28 of the second disc member 24. One base 52 is disposed adjacent one block 48, etc. It is to be appreciated that the bases 52 and the blocks 48 can abut each other or be spaced from each other.

Each of the bases 52 includes a post 54 extending transverse to the central axis C. The posts 54 and the blocks 48 secure together the first and second disc members 22, 24. Specifically, the posts 54 complement the slots 50 of the blocks 48 such that one post 54 is disposed in one slot 50 and another post 54 is disposed in another slot 50, etc. Further, one block 48, one base 52, and one post 54 is disposed between a pair of fins 36 and another block 48, another base 52, and another post 54 is disposed between another pair of fins 36, etc. The bases, and thus the posts 54, are disposed adjacent the outer periphery 32 of the second disc member 24. Having the posts 54 and the blocks 48 adjacent the outer periphery 32 prevents bending or flexing of the first and second disc members 22, 24.

A plurality of nuts 56 are secured the posts 54 for securing the posts 54 to the blocks 48 and thus securing the first and second disc members 22, 24 together. Specifically, one nut 56 is secured to an end of one post 54 and another nut 56 is secured to an end of another post 54, etc. The nuts 56 can be further defined as a threaded nuts 56, press-fit nuts 56, etc. The nuts 56 are recessed in the slots 50 of the blocks 48 for preventing the nuts 56 from being exposed to various components. Further, the posts 54 are recessed in the slots 50 of the blocks 48 for preventing the posts 54 from being exposed to various components.

Therefore, the blocks 48, the slots 50, the bases 52, the posts 54, and the nuts 56 cooperate to secure the first and second disc members 22, 24 together and prevent separation of the first and second disc members 22, 24. In other words, the blocks 48, the slots 50, the bases 52, the posts 54, and the nuts 56 cooperate to mechanical fasten the first and second disc members 22, 24 together. As such, the blocks 48, the slots 50, the bases 52, the posts 54, and the nuts 56 can be any suitable configuration and orientation for cooperating with each other.

The first disc member 22 of this embodiment also includes the fingers 38 and the second disc member 24 of this embodiment includes the recesses 42 as also discussed above. Further, the first disc member 22 includes the fins 36 and the second disc member 24 includes the flange 40 as discussed above. In other words, the first and second disc members 22, 24 of this embodiment as shown in FIGS. 5-8 are different from the first and second disc members 22, 24 of the embodiment illustrated in FIGS. 1-4, as discussed above, in that the holes 44 and pins 46 are eliminated and replaced with the blocks 48, bases 52 and nuts 56 that are use to couple the discs 22, 24 together.

With regard to FIGS. 9-12, the first disc member 22 includes a plurality of first ears 58 spaced from each other radially relative to the central axis C. More specifically, the first ears 58 extend from the second portion 28 of the first disc member 22. Even more specifically, the first ears 58 extend from, and may be integrally formed as a part of, the backing portion 228 of the first disc member 22. Each of the first ears 58 define a first opening 60 transverse to the central axis C. Likewise, the second disc member 24 includes a plurality of second ears 62 spaced from each other radially relative to the central axis C. More specifically, the second ears 62 extend from the second portion 28 of the second disc member 24. Even more specifically, the second ears 62 extend from, and may be integrally formed as a part of, the backing portion 228 of the second disc member 24. Each of the second ears 62 defines a second opening 61 transverse to the central axis C. The first and second ears 58, 62 cooperate with each other such that the first 60 and second openings 61 align. As such, one first ear 58 is disposed adjacent one second ear 62, etc. In certain embodiments, such as shown in FIGS. 9-12, the second ear 62 is spaced radially outwardly from the aperture 30 relative to the first ear 58, however, in alternative embodiments (not shown), it is contemplated that the first ear 58 may be spaced radially outwardly relative to the aperture 30 relative to the second ear 62. It is to be appreciated that the first and second ears 58, 62 can abut each other or be spaced from each other. The first ears 58 are adjacent the outer periphery 32 of the first disc member 22 and the second ears 62 are adjacent the outer periphery 32 of the second disc member 24. Further, one first ear 58 and one second ear 62 is disposed between a pair of fins 36 and another first ear 58 and another second ear 62 is disposed between another pair of fins 36, etc. Having the first and second ears 58, 62 adjacent the outer periphery 32 prevents bending or flexing of the first and second disc members 22, 24. It is to be appreciated that the first and second ears 58, 62, as well as the first 60 and second openings 61, can be any suitable configuration and orientation.

Figure 11:
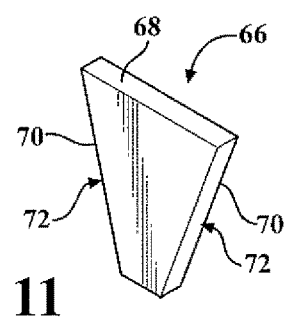
FIG. 11 is a perspective view of the plug of the brake rotor assembly of FIG. 9.

A plurality of plugs 66 are disposed in the first 60 and second openings 61 for securing the first and second ears 58, 62 to each other, and thus securing the first and second disc members 22, 24 together. Specifically, one plug 66 is disposed in one of the first 60 and second openings 61 and another plug 66 is disposed in another one of the first 60 and second openings 61. The plugs 66 can be further defined as wedges 68 as shown in FIG. 11. The wedges 68 include at least one side 70 having a tapered surface 72, and more specifically, two sides 70 having the tapered surface 72. The wedges 68 are wedged into the first 60 and second openings 61 for securing the first and second ears 58, 62 together, and thus securing the first and second disc members 22, 24 together. As such, the wedges 68 provide an interference fit. It is to be appreciated that the plugs 66 can provide an interference-fit or a friction fit, a press-fit, etc. It is to further be appreciated that the plugs 66 can be any suitable configuration and orientation.

Therefore, the first and second ears 58, 62, the first 60 and second openings 61, and the plugs 66 cooperate to secure the first and second disc members 22, 24 together and prevent separation of the first and second disc members 22, 24. In other words, the first and second ears 58, 62, the first 60 and second openings 61, and the plugs 66 cooperate to mechanical fasten the first and second disc members 22, 24 together. As such, the first and second ears 58, 62, the first 60 and second openings 61, and the plugs 66 can be any suitable configuration and orientation for cooperating with each other.

The first disc member 22 of the embodiment illustrated in FIGS. 9-12 also includes the fingers 38 and the second disc member 24 of this embodiment includes the recesses 42 as also discussed above in FIGS. 1-4 and 5-7. Further, the first disc member 22 includes the fins 36 and the second disc member 24 includes the flange 40 as discussed above. In other words, the first and second disc members 22, 24 of this embodiment are different from the first and second disc members 22, 24 of the first embodiment as discussed above in that the holes 44 and pins 46 are eliminated in this embodiment. In addition, the first and second disc members 22, 24 of the embodiment of FIGS. 9-12 are different from the first and second disc members 22, 24 of the embodiment of FIGS. 5-7 as discussed above in that the blocks 48, the slots 50, the bases 52, the posts 54, and the nuts 56 are eliminated in this embodiment.

In each of the embodiments, as noted above, the discs 22, 24 include a first portion 26 and a second portion 28. Generally, the caliper mechanism includes brake pads that face the outer disc surface 25, and more specifically faces the first portion 26 of the respective discs 22, 24. As such, when the brake pads engage the discs 22, 24, they engage a portion of the outer disc surface 25, and more specifically a wear surface 125 of the first portion 26 of each of the discs 22, 24, and such engagement by the brake pads acts to slow down the vehicle.

Figure 1A:
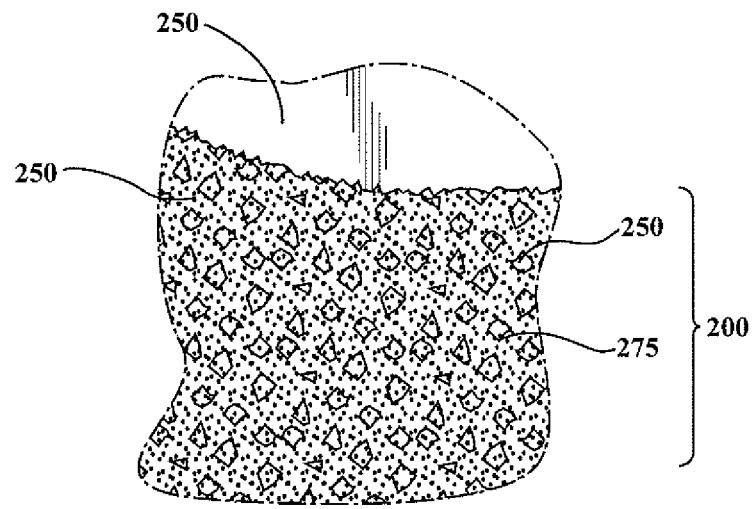
FIG. 1A is a close-up view of a portion of the brake rotor assembly of FIG. 1.
Figure 1B:
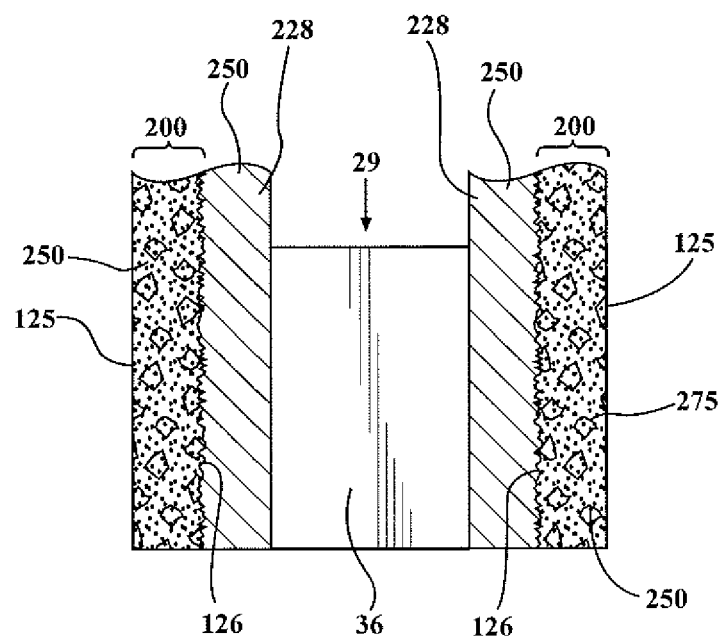
FIG. 1B is a section view of the brake rotor assembly taken along line 1B-1B.

Given this engagement with the brake pads, as represented herein with respect to the embodiment as shown in FIGS. 1-4 and specifically to FIGS. 1A and 1B, but applicable to the embodiments of FIGS. 5-8 and 9-12 and 13 and 14, the wear surface 125 of the first portion 26 should be durable and wear resistant at elevated temperatures normally encountered during braking in vehicles such as cars, trucks, or other heavy duty equipment. The second portion 28 of each of the discs 22, 24, as opposed to the wear surface 125 of the first portion 26, does not engage the brake pads to slow the vehicle and therefore does not require the same strength and wear resistant properties at elevated temperatures as the first portion 26. However, it is desirable that the material utilized in the second portion 28 have mechanical and physical properties that work in conjunction with the materials of the first portion 26 to enhance the ductility to the overall discs 22, 24, as well as maximizing the thermal properties for the discs 22, 24.

In addition, it is highly desirable that the first and second portions 26, 28 of each respective discs 22, 24 are formed as an integrated object that maximizes each of the characteristics described above (i.e. the discs 22, 24 are "integrally formed"). Stated differently, it is highly desirable that the first portion 26 and second portion 28 are not formed individually and then secondarily fused, laminated or otherwise coupled to form the respective first and second disc members 22, 24.

In order to achieve these desired characteristics, in each of embodiments of the present invention as described above, and as shown herein best in FIGS. 1A and 1B the first portion 26 of each of the integrally formed respective discs 22, 24, including the afore-mentioned wear surface 125, that engages the brake pads is a metal matrix composite (MMC) that includes a preform 200 formed from a composition having ceramic particles and ceramic fiber impregnated or infiltrated with a support element 250 formed from a metal that fills the plurality of voids 275 within the preform 200.

The second portion 28 is formed of the same support element 250 that infiltrates or impregnates the preform 200 to form the MMC first portion 26. Stated differently, the support element 250 of the second portion 28 is formed from the same metal that is utilized in the first portion 26.

Suitable metals that may be used as the support element 250 include, pure metals or metal alloys, including, for example, pure aluminum or aluminum alloys. It is to be appreciated that the pure metals, such as pure aluminum, can further be defined as metal substantially free of impurities.

The ceramic fibers used in the preform 200 typically comprise an element from period 2, 3, 4, or 5 of the periodic table of the elements. Typically, the ceramic fibers comprise aluminum, silicon, oxygen, zirconium, or carbon. The ceramic fibers are typically selected from the group of alumina-silica fibers, alumina-silica-zirconia fibers, carbon-graphite fibers, and combinations thereof. Carbon-graphite fibers are typically selected for applications requiring high strength.

In one embodiment, the ceramic fibers have an aspect ratio of greater than 3:1. In another embodiment, the ceramic fibers have an aspect ratio of greater than or equal to 5:1. In yet another embodiment, the ceramic fibers have an aspect ratio of greater than or equal to 10:1. It is to be appreciated that the term aspect ratio means a ratio of the longer dimension, i.e., length, of the ceramic fibers to the shorter dimension, i.e., diameter, of the ceramic fibers. The ceramic fibers typically have a length of from 5 to 500 µm, more typically from 50 to 250 µm. The ceramic fibers typically have a diameter of from 1 to 20 µm, more typically from 2 to 5 µm. Without intending to be limited by theory, it is believed that ceramic fibers having an aspect ratio of greater than 3:1 decrease the density of the preform 200 and optimize an infiltration potential of the support element 250 within the preform 200 by spacing out the ceramic particles.

The ceramic fibers are substantially randomly oriented in three dimensions in the preform 200. It is to be appreciated that the term substantially means that greater than 90 out of 100 ceramic fibers are randomly oriented in three dimensions in the preform 200. It is further to be appreciated that the term randomly oriented means that adjacent ceramic fibers are disposed in different dimensions and that adjacent ceramic fibers are free from a pattern of alignment. More specifically, adjacent ceramic fibers oriented in different dimensions are typically present in the preform 200 in an amount of greater than 85 parts by volume based on 100 parts by volume of the preform 200. Further, adjacent ceramic fibers oriented in the same dimension are typically present in the preform 200 in an amount of from 0.1 to 5 parts by volume based on 100 parts by volume of the preform 200. Without intending to be limited by theory, it is believed that ceramic fibers substantially randomly oriented in three dimensions provide the preform 200 with uniform strength in three dimensions. As such, the preform 200 of the present invention is typically free from fatigue and/or failure in a third, non-reinforced dimension as compared to preform 200s with ceramic fibers oriented in only two dimensions.

The ceramic fibers are typically substantially homogeneously dispersed in the preform 200. It is to be appreciated that the term substantially means greater than 90 out of 100 ceramic fibers in the preform 200 are homogeneously dispersed in the preform 200. Further, it is to be appreciated that the term homogeneously dispersed means that greater than 85% by volume of the ceramic fibers in the preform 200 are uniformly distributed on a scale of twice the diameter of the ceramic fiber. That is, greater than 85 out of 100 ceramic fibers are spaced at least one ceramic fiber diameter away from an adjacent ceramic fiber. Without intending to be limited by theory, it is believed that ceramic fibers that are substantially homogeneously dispersed in the preform 200 provide the preform 200 with uniform density and, consequently, uniform strength. That is, the preform 200 is typically free from entanglements and conglomerations of ceramic fibers that cause weak points that typically decrease strength and stiffness of the preform 200. Since the preform 200 exhibits uniform density, it is typically unnecessary to add additional ceramic fibers to the preform 200 after formation to remedy inconsistent density, thereby minimizing production costs of the preform 200. Additionally, since the preform 200 of the present invention is typically free from blockages caused by entanglements and conglomerations of ceramic fibers, the preform 200 of the present invention also minimizes infiltration blockages caused by entanglement and conglomeration and enables excellent metal infiltration for efficient production of the metal matrix composite.

An uncured preform 200 is typically cured or sintered to form a cured preform 200, i.e., the preform 200 that has been cured or sintered. During curing or sintering, any liquid components of the uncured preform 200 typically burn off, and solids remain in the preform 200. That is, after curing or sintering, solids are typically present in the preform 200 in an amount of from 20 to 50 parts by volume based on 100 parts by volume of the preform 200. Solids are more typically present in the preform 200 in an amount of from 30 to 40 parts by volume based on 100 parts by volume of the preform 200. Air is typically present in the preform 200 in an amount of from 50 to 80 parts by volume based on 100 parts by volume of the preform 200. Air is more typically present in the preform 200 in an amount of from 60 to 70 parts by volume based on 100 parts by volume of the preform 200.

The ceramic fibers are typically present in the uncured preform 200 in an amount of from 5 to 25 parts by weight based on 100 parts by weight of solids in the uncured preform 200. The ceramic fibers typically remain as solids in the preform 200 after curing or sintering. That is, the ceramic fibers are typically present in the preform 200 in an amount of from 3 to 15 parts by volume based on 100 parts by volume of the preform 200. The ceramic fibers are more typically present in the preform 200 in an amount of from 5 to 10 parts by volume based on 100 parts by volume of the preform 200. A specific example of a ceramic fiber is an alumina-silica fiber, commercially available from Thermal Ceramics Inc. of Atlanta, Ga.

The ceramic particles typically provide the preform 200 with excellent stiffness and wear resistance and typically comprise an element from period 2, 3, or 4 of the periodic table of the elements. The ceramic particles more typically comprise an element from period 2 or 3 of the periodic table of the elements. Typically, the ceramic particles comprise silicon, oxygen, carbon, aluminum, or boron. The ceramic particles are typically selected from the group of silicon carbide, alumina, boron carbide, and combinations thereof.

The ceramic particles typically each have a reference dimension of from 5 to 50 μm, more typically 5 to 30 μm. One skilled in the art typically selects ceramic particles having a reference dimension of from 5 to 10 μm, i.e., a smaller ceramic particle, for applications requiring high strength and stiffness. In contrast, one skilled in the art typically selects ceramic particles having a reference dimension of from 10 to 30 μm, i.e., a larger ceramic particle, for applications requiring high wear resistance. One skilled in the art typically combines smaller ceramic particles and larger ceramic particles for applications requiring high strength, stiffness, and wear resistance.

The ceramic particles are typically present in the uncured preform 200 in an amount of from 50 to 75, more typically 60 to 70 parts by weight based on 100 parts by weight of solids in the uncured preform 200. The ceramic particles typically remain as solids in the preform 200 after curing or sintering. That is, the ceramic particles are typically present in the preform 200 in an amount of from 15 to 30 parts by volume based on 100 parts by volume of the preform 200. The ceramic particles are more typically present in the preform 200 in an amount of from 22 to 28 parts by volume based on 100 parts by volume of the preform 200. A specific example of a ceramic particle is silicon carbide, commercially available from Washington Mills of Niagara Falls, N.Y.

The preform 200 can further comprise a binder component. Without intending to be limited by theory, it is believed that the binder component provides the uncured preform 200 with strength. The binder component typically comprises an organic binder and an inorganic binder. More specifically, without intending to be limited by theory, it is believed that the organic binder provides an uncured ceramic article, i.e., the uncured preform 200, with strength, whereas the inorganic binder provides a cured preform 200, i.e., the preform 200, with strength.

The organic binder of the binder component typically comprises a first component and a second component. The first component is typically a starch. Without intending to be limited by theory, it is believed that the first component provides the uncured preform 200 with strength and reduces adhesion of the second component. The first component is typically present in the uncured preform 200 in an amount of from 1 to 10 parts by weight based on 100 parts by weight of solids in the uncured preform 200. A specific example of a first component is starch, commercially available as Westar 3+ Cationic Starch from Wesbond Corporation of Wilmington, Del.

The second component of the organic binder typically comprises a cellulose ether. The cellulose ether typically exhibits reverse thermal gelation and provides lubricity during formation of the uncured preform 200. Without intending to be limited by theory, it is believed that the cellulose ether also typically provides surface activity, plasticity, uniform rheology, and uniform distribution of air during formation of the uncured preform 200. It is also believed that the cellulose ether also typically provides the uncured preform 200 with strength. The cellulose ether is typically selected from the group of methyl cellulose, hydroxypropylmethylcellulose, hydroxybutylmethylcellulose, and combinations thereof. The second component is typically present in the uncured preform 200 in an amount of from 0.5 to 10 parts by weight based on 100 parts by weight of solids in the uncured preform 200. A suitable second component is hydroxypropylmethylcellulose, commercially available under the trade name Methocel™ A4M from The Dow Chemical Company of Midland, Mich.

The organic binder is typically present in the uncured preform 200 in an amount of from 0.5 to 25 parts by weight based on 100 parts by weight of solids in the uncured preform 200.

The inorganic binder of the binder component is typically silica. Without intending to be limited by theory, it is believed that the inorganic binder provides the preform 200 with strength. The inorganic binder is typically present in the uncured preform 200 in an amount of from 2 to 10 parts by weight based on 100 parts by weight of solids in the uncured preform 200. The inorganic binder typically remains as solids in the preform 200 after curing or sintering. That is, the inorganic binder is typically present in the preform 200 in an amount of from 2 to 5 parts by volume based on 100 parts by volume of the preform 200. A suitable inorganic binder is silica, commercially available under the trade name Bindzil 1440 Colloidal Silica from Wesbond Corporation of Wilmington, Del.

The binder component is typically present in the uncured preform 200 in an amount of from 5 to 35 parts by weight based on 100 parts by weight of solids in the uncured preform 200.

The uncured preform 200 may further comprise an additive component. The additive component typically comprises a filler. One skilled in the art typically selects the filler to control the density of the preform 200. That is, the filler is typically included in the uncured preform 200 according to the weight percent of ceramic particles and ceramic fibers in the uncured preform 200. The filler typically spaces out the ceramic particles and ceramic fibers to provide the preform 200 with desired density and to allow effective metal infiltration during formation of the metal matrix composite. The filler may be any filler known in the art. The filler is typically selected to burn off during heating, i.e., curing or sintering, of the preform 200. The filler is typically selected from walnut shell flour, cellulose fiber, air, and combinations thereof.

The filler is typically present in the uncured preform 200 in an amount of from 0.5 to 20 parts by weight based on 100 parts by weight of solids in the uncured preform 200. A suitable filler is walnut shell flour, commercially available under from Ecoshell of Corning, Calif.

The additive component may further comprise an air entrainment agent. The air entrainment agent may be any air entrainment agent known in the art that is compatible with the second component of the binder component. One skilled in the art typically selects the air entrainment agent to increase air bubble content in the preform 200 and stabilize air bubble size to effect uniform air bubble distribution in the preform 200. Without intending to be limited by theory, it is believed that the air entrainment agent decreases surface tension, optimizes dispersability, and contributes to the formation of fine, stable air bubbles to provide the open, porous preform 200 that is receptive to metal infiltration. The air entrainment agent is typically present in the uncured preform 200 in an amount of from 0.01 to 1 part by weight based on 100 parts by weight of solids in the uncured preform 200. A suitable air entrainment agent is commercially available under the trade name Silipon® RN from Hercules of Wilmington, Del.

The additive component may further comprise a surfactant. The surfactant may be any known surfactant in the art that is compatible with the second component of the binder component. One skilled in the art typically selects the surfactant to lubricate the ceramic fibers and ceramic particles. The surfactant is typically present in the uncured preform 200 in an amount of from 0.01 to 1 part by weight based on 100 parts by weight of solids in the uncured preform 200.

The additive component may further comprise a foam stabilizing agent. The foam stabilizing agent may be any known foam stabilizing agent in the art that is compatible with the second component of the binder component. One skilled in the art typically selects the foam stabilizing agent to minimize the formation of undesired air bubbles in the uncured preform 200. The foam stabilizing agent is typically present in the uncured preform 200 in an amount of from 0.01 to 1 part by weight based on 100 parts by weight of solids in the uncured preform 200. The additive component is typically present in the uncured preform 200 in an amount of from 5 to 30 parts by weight based on 100 parts by weight of solids in the uncured preform 200.

The metal matrix composite of the first portion 26 also includes a support element 250 formed of a metal that impregnates through the preform 200. The metal is heated to form the molten metal. In particular, when the support element 250 is being formed, molten metal encapsulates the outer surface of the preform 200 and impregnates the voids 275 space of the preform 200. It is to be appreciated that the metal may be a single metal or an alloy. Typically, the metal used in the manufacturing of the metal matrix composite is selected based on a combination of a strength-to-weight ratio, a thermal conductivity and cost. Generally, a lightweight metal, as compared to the weight of iron, meeting the requirements for yield strength and thermal conductivity is selected.

The yield strength of the metal is typically about 100 to 200 MPa. The thermal conductivity of the metal is typically about 130 to 180 W/m*K. It is to be appreciated that the values for yield strength and thermal conductivity are all heavily dependent on the metal or the alloy used. The yield strength ranges for cast aluminum are from about 60 to 400 MPa, cast magnesium are from about 90 to 150 MPa, and cast titanium are from about 700 to 1,100 MPa. The thermal conductivity ranges for cast aluminum are from about 100 to 200 W/m*K, cast magnesium are from about 50 to 100 W/m*K, and cast titanium are from about 5 to 25 W/m*K. The cost of the metal is a consideration factored into the selection of the metal used. Typically, the metal is selected from the group of aluminum, magnesium, titanium, and combinations thereof. In one embodiment, the metal comprises aluminum. In another embodiment, the metal consists essentially of aluminum. In still another embodiment the metal consists of aluminum.

Once the molten metal impregnates though the preform 200, the inner surface of the preform 200 is defined by both the support element 250 and the preform 200 itself. Said differently, the inner surface of the preform 200 comprises ceramic fibers, ceramic particles and the metal. The inner surface of the preform 200 infiltrated with the support element forms the wear surface 125 of the first portion 26. The wear surface 125 therefore defines the outer disc surface 25 of the first portion 26. The preform 200 is present on the wear surface 125 in an amount of from about 10 to 60%, more typically about 20 to 50%, and most typically about 32 to 38%, based on the surface area of the wear surface 125. It is to be appreciated that the preform 200 is uniformly distributed throughout the surface area of the wear surface 125 of the first portion 26. The combination of the metal and the preform 200 of the wear surface 125 of the first portion 26 provides excellent strength and wear resistance at elevated temperatures.

The present invention also relates to a method for forming the first disc member 22 and the second disc member 24, and the products formed therefrom, that expands upon and modifies the procedure for forming metal matrix composite materials that are described in U.S. Pat. No. 8,016,018 to Wood et al. and its copending U.S. patent application Ser. No. 12/174,982, which are herein incorporated by reference. The difference between the method described in U.S. Pat. No. 8,016,018 to Wood et al. and its copending U.S. patent application Ser. No. 12/174,982 and the method for forming the disc members 22, 24 of the present application relates first to the shape of the formed preform 200, and also to the inclusion of a gap or open area (i.e. an open section) within the cavity of the mold that does not include the ceramic preform 200. This open section corresponds to the second portion 28 of the respective disc members 22, 24.

Thus, the method for forming the first disc member 22, or the second disc member 24, includes the step of first extruding a composition comprising ceramic particles and ceramic fibers through a multi-screw extruder to form an extrudate, wherein the ceramic fibers are randomly oriented in three dimensions as the composition is extruded through the extruder. Next, the extrudate is formed to a desired configuration to form a preform 200 comprising the three-dimensional shape of the first portion of the respective disc member 22, 24. The preform 200 is then introduced to a predetermined cavity portion of a mold comprising the three-dimensional shape of first portion 26 of the respective disc member 22, 24. The rest of the cavity of the mold is shaped to correspond to the three dimensional shape of the second portion 28. The mold is closed and a molten metal (i.e. the support element 250) is injected into the cavity of the mold under pressure. A first portion of the molten metal (i.e. of the first support element) infiltrates the preform 200, while the remainder of the molten material (i.e. corresponding to the the radially inward portion 128 (if utilized) and to a backing portion 228) fills the open section of the cavity corresponding to the second portion 28 of the respective disc 22, 24. The molten metal is then cooled to form respective first portions 26 and second portions 28 of the respective disc member 22, 24, which are then removed from the mold and available for use. The outer disc surfaces 25 of the first portion 26 of the respective disc member 22, 24 may then be machined to a final configuration such that ceramic fibers are positioned along their respective outer wear surface 25.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A brake rotor assembly comprising:
(a) a first disc member having an inner disc surface and an outer disc surface and comprising:
a first preform comprising ceramic particles and ceramic fibers with said first preform having an inner surface and an opposing outer surface and defining a plurality of voids;
a first support element comprising a metal material, a first portion of said first support element disposed within said plurality of voids of said first preform between said inner surface and said opposing outer surface of said first preform for forming a metal matrix composite with said metal material of said first support element terminating at said outer surface of said first preform such that said opposing outer surface of said first preform remains exposed;
said first support element further comprising a backing portion extending from said inner surface of said first preform such that said backing portion is outside of said first preform, said backing portion of said first support element formed of said metal material and defining at least a portion of said outer disc surface of said first disc member;
said first support element of said first disc member further comprises a radially inward portion extending radially inwardly of said first preform such that said radially inward portion is outside of said first preform; and
a first wear surface defined by said exposed outer surface of said first preform and by said first portion of said first support element, said first wear surface defining a portion of said outer disc surface of said first disc member; and
(b) a second disc member coupled to said first disc member, said second disc member having an inner disc surface and an outer disc surface and comprising:
a second preform comprising ceramic particles and ceramic fibers with said second preform having an inner surface and an opposing outer surface and defining a plurality of voids;
a second support element comprising said metal material, a first portion of said second support element disposed within said plurality of voids of said second preform between said inner surface and said opposing outer surface of said second preform for forming a metal matrix composite with said metal material of said second support element terminating at said opposing outer surface of said second preform such that said opposing outer surface of said second preform remains exposed;
said second support element further comprising a backing portion extending from said inner surface of said second preform such that said backing portion is outside of said second preform, said backing portion of said second support element formed of said metal material and defining at least a portion of said outer disc surface of said second disc member;
said second support element of said second disc member further comprises a radially inward portion extending radially inwardly of said second preform such that said radially inward portion is outside of said first preform; and
a second wear surface defined by said exposed outer surface of said second preform and by said first portion of said second support element, said second wear surface defining a portion of said outer disc surface of said second disc member;
wherein said backing portion of each of said first support element and said second support element are located between said first wear surface and said second wear surface when said first disc member is coupled to said second disc member and
wherein said inner disc surface of said first disc member is spaced apart from said second disc member when said first disc member is coupled to said second disc member.

2. The brake rotor assembly of claim 1, wherein said said radially inward portion of said first support element defines another portion of said outer disc surface of said first disc member and defines another portion of said inner disc surface of said first disc member.

3. The brake rotor assembly of claim 2, wherein said radially inward portion of said second support element defines another portion of said outer disc surface of said second disc member and defines another portion of said inner disc surface of said second disc member.

4. The brake rotor assembly according to claim 1, wherein said backing portion of said first support element includes a plurality of fins extending in a direction towards said second disc member along said central axis.

5. The brake rotor assembly of claim 4, wherein an end portion of each of said plurality of fins abuts said inner disc surface of said second disc member.

6. The brake rotor assembly according to claim 1, wherein said backing portion of said second support element further comprises a flange extending transverse from said central axis from said outer disc surface and in a direction outwardly away from said second disc member.

7. The brake rotor assembly according to claim 1, wherein said backing portion of said first support element includes a plurality of fingers extending in a direction along said central axis towards said second disc member to engage a plurality of recesses contained within said backing portion of said second support element.

8. The brake rotor assembly according to claim 3, wherein said backing portion of said first support element includes a plurality of fins extending in a direction along said central axis towards said second disc member; and wherein said radially inward portion of said first support element includes a plurality of fingers extending in a direction along said central axis towards said second disc member to engage a plurality of recesses contained within said radially inward portion of said second support element.

9. The brake rotor assembly according to claim 1, wherein said inner disc surface of said backing portion of said first support element includes at least one block portion and wherein said inner disc surface of said backing portion of said second support element includes a corresponding at least one base portion including a post, wherein said post of a respective one of said at least one base portion is coupled within a slot portion of a corresponding one of said plurality of base portions to couple said first disc member to said second disc member.

10. The brake rotor assembly according to claim 9, further comprising a nut coupled to an end of said post to secure said first disc member to said second disc member.

11. The brake rotor assembly according to claim 1, wherein said first preform is present at said first wear surface in an amount of from about 10 to 60 percent based on a surface area of said first wear surface.

12. The brake rotor assembly according to claim 1, wherein said first preform is present at said first wear surface in an amount of from about 20 to 50 percent based on a surface area of said first wear surface.

13. The brake rotor assembly according to claim 1, wherein said first preform is present at said at said first wear surface in an amount of from about 32 to 38 percent based on a surface area of said first wear surface.

14. The brake rotor assembly according to claim 1, wherein said ceramic fibers of said first preform and said second preform have an aspect ratio of greater than 3:1.

15. The brake rotor assembly according to claim 14, wherein greater than 90 percent of the ceramic fibers of said first preform and said second preform are randomly orientated in three dimensions.

16. The brake rotor assembly according to claim 1, wherein said ceramic fibers of said first preform and said second preform are selected from the group of alumina-silica fibers, alumina-silica-zirconia fibers, carbon-graphite fibers, and combinations thereof.

17. The brake rotor assembly according to claim 1, wherein said metal is selected from the group of aluminum, magnesium, titanium, and combinations thereof.

18. The brake rotor assembly according to claim 1, wherein said ceramic particles of said first preform and said second preform are selected from the group of elements from period 2, 3, or 4 of the periodic table of the elements.

* * * * *